US010822841B2

(12) United States Patent
Colligan (10) Patent No.: US 10,822,841 B2
(45) Date of Patent: Nov. 3, 2020

(54) DOOR LATCH WITH DELAYED RETURN MECHANISM (71) Applicant: Accurate Lock & Hardware Co. LLC, Stamford, CT (US)

(72) Inventor: Francis Colligan, New Haven, CT (US)

(73) Assignee: Accurate Lock & Hardware Co. LLC, Stamford, CT (US)

( * ) Notice: Subject to any disclaimer, the term of this patent is extended or adjusted under 35 U.S.C. 154(b) by 512 days.

(21) Appl. No.: 15/637,745

(22) Filed: Jun. 29, 2017

(65) Prior Publication Data

US 2018/0058110 A1   Mar. 1, 2018

Related U.S. Application Data

(60) Provisional application No. 62/378,926, filed on Aug. 24, 2016.

(51) Int. Cl.
*E05B 77/42* (2014.01)
*E05B 85/18* (2014.01)
(Continued)

(52) U.S. Cl.
CPC .......... *E05B 77/42* (2013.01); *E05B 17/0041* (2013.01); *E05B 85/18* (2013.01);
(Continued)

(58) Field of Classification Search
CPC ...... E05B 77/42; E05B 17/0041; E05B 85/18; E05B 17/0045; E05B 77/00; E05B 85/00; E05B 63/08; E05B 63/10; E05B 17/185; E05B 77/36; F16F 9/00; F16F 9/142;
Y10T 292/1015; Y10T 292/1014; Y10T 292/1016; Y10T 292/096; Y10T 292/1017; Y10T 292/0834; Y10T 292/0836; Y10T 292/0837; Y10T 292/0847; Y10T 292/0841; Y10T 292/101; Y10T 70/5226; Y10T 70/523; Y10T 70/5235; Y10T 70/5239; Y10T 70/527; Y10T 70/5243;
(Continued)

(56) References Cited

U.S. PATENT DOCUMENTS 3,160,911 A   12/1964  Morris
4,468,836 A    9/1984  Omata
(Continued)

FOREIGN PATENT DOCUMENTS

DE   102005015712 A1   10/2006
DE      10036945 A1    2/2007
(Continued)

*Primary Examiner* — Kristina R Fulton
*Assistant Examiner* — Faria F Ahmad
(74) *Attorney, Agent, or Firm* — Forge IP, PLLC (57) ABSTRACT

A delayed return mechanism, such as for a door latch, including a housing having a hole with an axis, a cavity in the housing at least partially filled with a fluid media, a hub disposed in the cavity including a spindle hole coaxial with the hole in the housing including teeth within the spindle hole to engage a spindle, the hub being rotatable about the axis and having a fin extending radially outward in the cavity, and a channel through which the fluid media passes during rotation of the hub to control flow of the fluid media about the cavity.

25 Claims, 13 Drawing Sheets

(51) Int. Cl.

| | | |
|---|---|---|
| *F16F 9/00* | (2006.01) | |
| *F16F 9/14* | (2006.01) | |
| *E05B 17/00* | (2006.01) | |
| *E05B 77/00* | (2014.01) | |
| *E05B 85/00* | (2014.01) | |
| *E05B 63/08* | (2006.01) | |
| *E05B 63/10* | (2006.01) | |
| *E05B 77/38* | (2014.01) | |
| *E05B 17/18* | (2006.01) | |
| *E05B 77/36* | (2014.01) | |

(52) U.S. Cl.
CPC ............... *F16F 9/00* (2013.01); *F16F 9/145* (2013.01); *E05B 17/0045* (2013.01); *E05B 17/0054* (2013.01); *E05B 17/185* (2013.01); *E05B 63/08* (2013.01); *E05B 63/10* (2013.01); *E05B 77/00* (2013.01); *E05B 77/36* (2013.01); *E05B 77/38* (2013.01); *E05B 85/00* (2013.01); *Y10T 292/0834* (2015.04); *Y10T 292/0836* (2015.04); *Y10T 292/0837* (2015.04); *Y10T 292/0841* (2015.04); *Y10T 292/0847* (2015.04); *Y10T 292/096* (2015.04); *Y10T 292/0945* (2015.04); *Y10T 292/101* (2015.04); *Y10T 292/1014* (2015.04); *Y10T 292/1015* (2015.04); *Y10T 292/1016* (2015.04); *Y10T 292/1017* (2015.04)

(58) Field of Classification Search
CPC . Y10T 70/5274; Y10T 292/0945; Y10S 70/48
See application file for complete search history.

(56) References Cited

U.S. PATENT DOCUMENTS

| | | | |
|---|---|---|---|
| 4,550,470 A | 11/1985 | Omata | |
| 4,643,006 A * | 2/1987 | Bron | E05B 47/0002 292/173 |
| 4,773,242 A * | 9/1988 | Smith | E05B 17/185 16/82 |
| 5,092,642 A | 3/1992 | Lindmayer et al. | |
| 5,111,548 A | 5/1992 | Ohshima | |
| 5,277,282 A * | 1/1994 | Umemura | F16F 7/06 16/85 |
| 5,449,054 A | 9/1995 | Wiese et al. | |
| 5,546,632 A * | 8/1996 | Robinson | B64G 1/22 16/277 |
| 5,697,122 A | 12/1997 | Okabe et al. | |
| RE36,694 E | 5/2000 | McFarland | |
| 6,173,822 B1 * | 1/2001 | Korb | F16F 9/145 188/293 |
| 6,318,522 B1 * | 11/2001 | Johnston | B60G 3/202 188/267.2 |
| 6,572,159 B2 | 6/2003 | Lambertz et al. | |
| 6,840,355 B2 | 1/2005 | Iwashita | |
| 6,968,929 B2 * | 11/2005 | Doornbos | F16D 57/00 188/290 |
| 7,051,618 B2 * | 5/2006 | Anton | B29C 66/5344 464/180 |
| 8,689,952 B2 * | 4/2014 | Sato | F16F 9/145 188/296 |
| 8,757,337 B2 * | 6/2014 | Kojima | F16F 9/145 188/290 |
| 9,080,628 B2 * | 7/2015 | Shumozaki | F16F 9/145 |
| 9,103,390 B2 * | 8/2015 | Shimozaki | F16F 9/12 |
| 9,366,061 B2 | 6/2016 | Kwon | |
| 2001/0037702 A1 | 11/2001 | McFarland et al. | |
| 2007/0000742 A1 * | 1/2007 | Cultraro | E05F 5/10 188/290 |
| 2011/0148575 A1 * | 6/2011 | Sobecki | E05B 85/103 340/5.64 |
| 2011/0226573 A1 * | 9/2011 | Kojima | F16F 9/44 188/307 |
| 2012/0305351 A1 | 12/2012 | Kopto et al. | |
| 2014/0319850 A1 * | 10/2014 | Berger | E05B 15/101 292/177 |
| 2015/0076845 A1 * | 3/2015 | Ou | E05B 63/006 292/358 |
| 2017/0275918 A1 * | 9/2017 | Colligan | E05B 17/0041 |
| 2019/0226233 A1 * | 7/2019 | Yalamati | E05B 9/002 |
| 2019/0345734 A1 * | 11/2019 | Wu | E05B 17/0041 |

FOREIGN PATENT DOCUMENTS

| | | |
|---|---|---|
| EP | 0682167 A1 | 11/1995 |
| JP | 2007107271 A | 4/2007 |

* cited by examiner

DOOR LATCH WITH DELAYED RETURN MECHANISM

FIELD OF THE INVENTION

The present invention relates to a door latch, and more specifically to a door latch with a mechanism to delay return of the latch for noise reduction purposes.

BACKGROUND OF THE INVENTION

Mortise door locks are known in the art and typically include a locking mechanism that is set within the body of a door in a recess or mortise, as opposed to one attached to the door surface. Mortise door locks typically include the combination of a latch, operated by a door knob or lever, and a separate deadbolt mechanism. Some mortise door locks omit the deadbolt mechanism.

In normal the operation of a lock, a lever, knob or thumb piece is actuated to open a door. These are manually depressed to open the door and return to their original position via a spring. This causes noise due to the returning lever hitting a stop in the lock.

Mortise door locks are often used in institutional environments, such as hospitals. Hospitals tend to be busy and loud with many people coming and going from patients rooms at all hours. This makes it difficult for patients to sleep or rest comfortably. Thus, there is a desire to reduce noise in hospitals, and one way to do so is by quieting the door lock mechanisms and trim.

There have been some attempts to quiet door locks and door handle mechanisms, particularly in the automotive field. For example, U.S. Pat. No. 6,572,159 to Lambertz et al. discloses a damped actuating system for a motor vehicle door latch. U.S. Pat. No. 5,092,642 to Lindmayer et al. discloses a door handle for motor vehicles with a damping element to decrease speed of the actuating lever and reduce impact noise in the return movement. However, there remains a need for mechanisms to quiet architectural door latches such as mortise door locks.

It is therefore desired to provide a latch for an architectural door that achieves a low noise threshold.

SUMMARY OF THE INVENTION

Accordingly, it is an object of the present invention to provide a door latch with additional features to reduce noise. It is also an object to provide a delayed return mechanism for use on a door latch and also on other mechanism devices for which delayed return is desired.

These and other objectives are achieved by providing a delayed return mechanism or damper, including a housing including a hole with an axis, a cavity in the housing at least partially filled with a fluid media, a hub disposed in the cavity including a spindle hole coaxial with the hole in the housing including teeth within the spindle hole to engage a spindle, the hub being rotatable about the axis and having a fin extending radially outward in the cavity, and a channel through which the fluid media passes during rotation of said hub to control flow of the media about the cavity. In some embodiments the fluid media may have a viscosity of at least 100,000 cP and/or a shear rate of at least 50 (1/s).

In some embodiments, the mechanism includes an adjustment element adjustably restricting flow of the fluid media about the cavity. Rotation of the hub in a first direction is partially resisted by the media and rotation of the hub in a second opposite direction is partially resisted by the media. In some embodiments resistance in the second direction is greater than resistance in the first direction.

The fin may be a rigid element extending radially outward from the hub, or may include a fixed part and a flexible part adjacent to the fixed part. In some embodiments the fin includes at least one groove or hole through which the media passes.

In some embodiments, the adjustment element includes an adjuster moveable into and out of a portion of the cavity, wherein movement of the adjuster changes a cross section of the portion of the cavity. The portion of the cavity may be an elongated channel extending from a first opening on a first side of the cavity to a second opening on a second side of the cavity, wherein the adjuster is moveable into and out of the channel via a hole extending through an exterior surface of the housing.

Further provided is a door latch for an architectural door, including a latch housing including a front plate attachable to a door edge, a latch bolt at least partially slideable into and out of the latch housing through the front plate, a spindle for receiving a door handle, a retractor for actuating the latch bolt, the retractor including a retractor hub with a spindle hole, and a damper. The damper includes a housing including a cavity at least partially filled with a fluid media, a damper hub disposed in the cavity including a spindle hole coaxial with the spindle hole of the retractor hub, the hub having a fin extending radially outward in the cavity, and a channel through which the fluid media passes during rotation of said hub to control flow of the media about the cavity. In some embodiments, the damper includes an adjustment element adjustably restricting flow of the fluid media about the cavity. The door latch also includes a spindle extending through the latch housing via the spindle holes of the retractor hub and the damper hub, rotation of the spindle causing rotation of the retractor hub and movement of the latch bolt, the movement of the latch bolt at least partially dampened by the damper.

In some embodiments, the damper is positioned within or integral with the latch housing. In other embodiments, the damper is attached to an exterior surface of the latch housing.

Other objects of the invention and its particular features and advantages will become more apparent from consideration of the following drawings and accompanying detailed description.

DETAILED DESCRIPTION OF THE INVENTION

Figure 1:
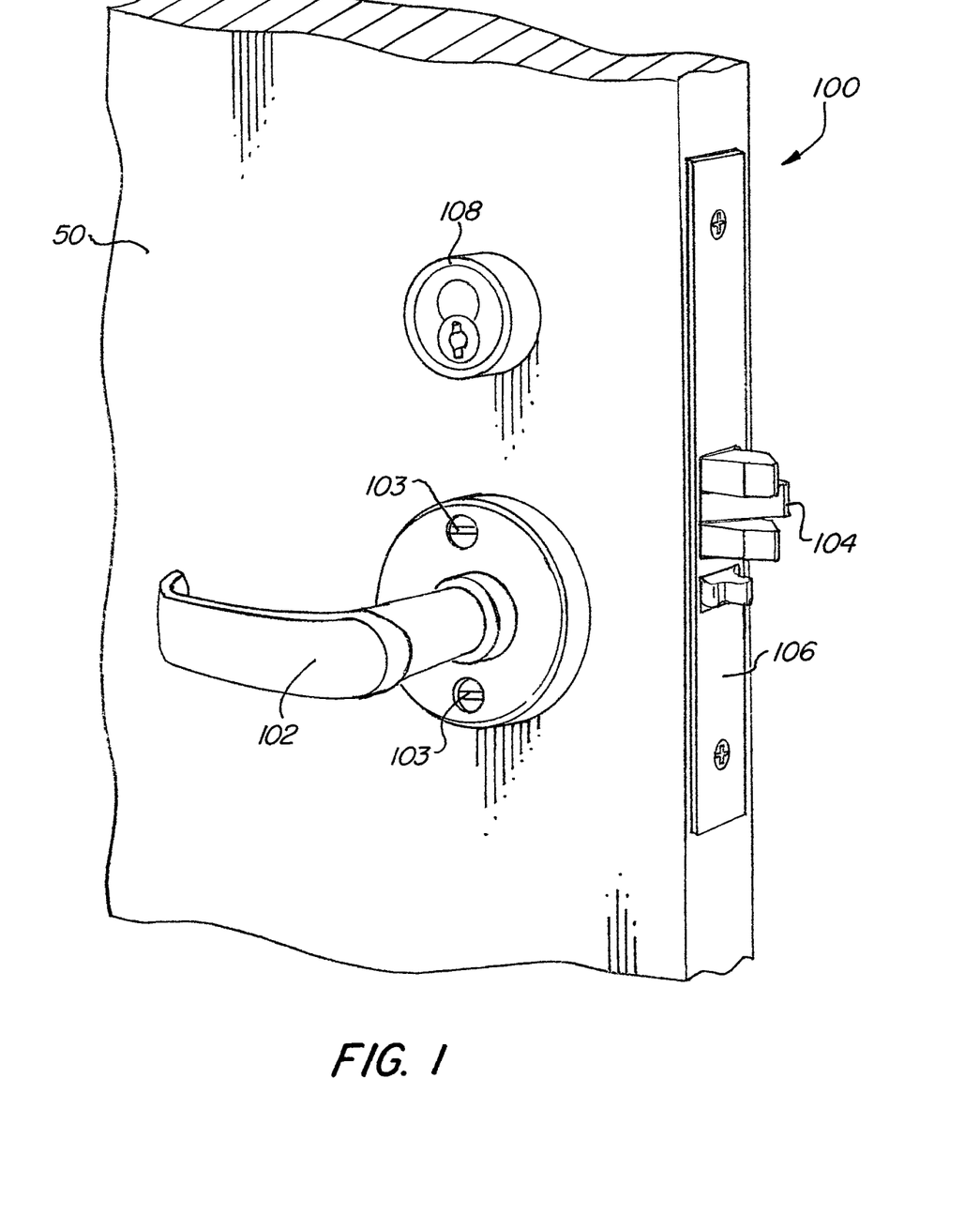
FIG. 1 shows an architectural door including a door latch assembly according to an exemplary embodiment of the present invention.

FIG. 1 illustrates a door latch assembly 100 according to the present invention installed in a swinging architectural door 50. The latch assembly 100 includes a handle 102, a latch 104, and an edge mounting plate 106. In some embodiments, the latch assembly 100 also includes a lock 108.

Figure 2:
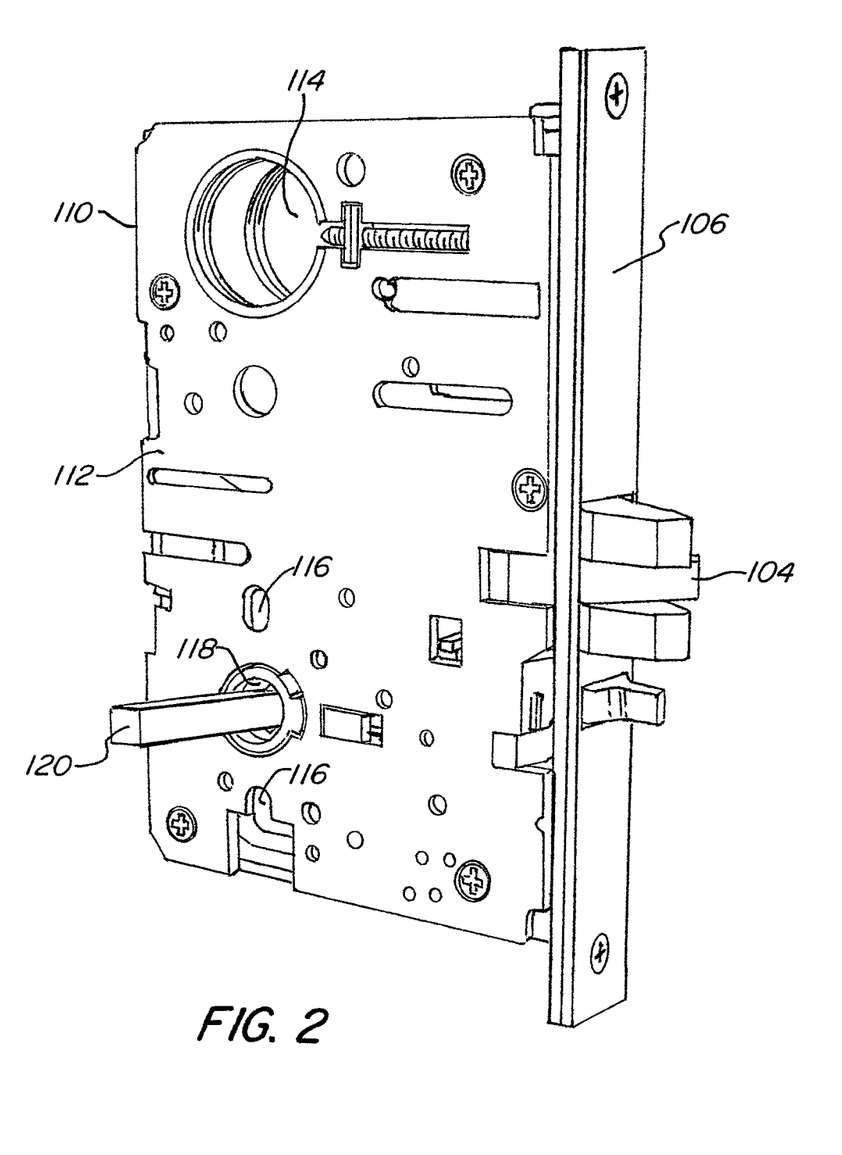
FIG. 2 shows a perspective view of the door latch assembly.
Figure 3:
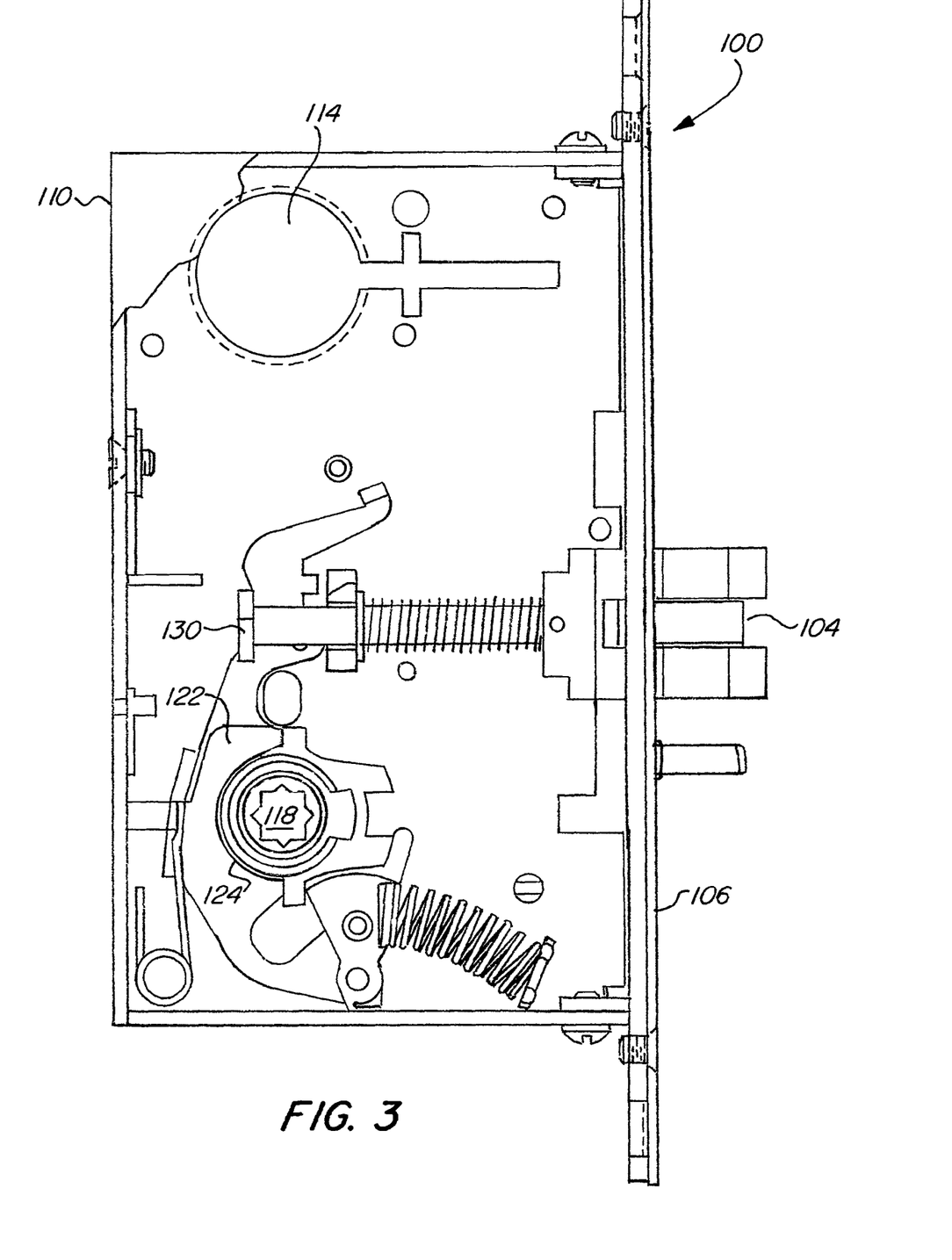
FIG. 3 is a cutaway view of the door latch assembly.

FIGS. 2-3 show the door latch assembly 100 removed from the door 50. FIG. 2 is a perspective view. The latch assembly 100 includes housing 110 with at least one side panel 112. The housing 110 has an opening 114 for receiving the optional lock 108. The housing 110 also has holes 116, through the side panel 112, for receiving screws or bolts 103 when mounting the door handle 102 to the housing 110. There is an opening 118 for receiving a spindle 120 of the door handle 102 which extends at least partially through the housing 110. The spindle 120 typically has a non-circular cross-section, such as square, to engage within the opening 118 and operate the door latch assembly 100 by rotation. In some embodiments, there is an opening 118 and a spindle 120 on each of the two sides of the housing 110 operating independent of one another.

FIG. 3 is a cutaway view of a door latch assembly 100. Inside the housing 110, the latch assembly 100 includes a retractor with a lever 122 and a retractor hub 124. The lever 122 is actuated by rotation of the spindle 120 which extends through the opening 118 in the hub 124. The lever 122 moves a bolt 130 to advance and return the latch 104.

Figure 4:
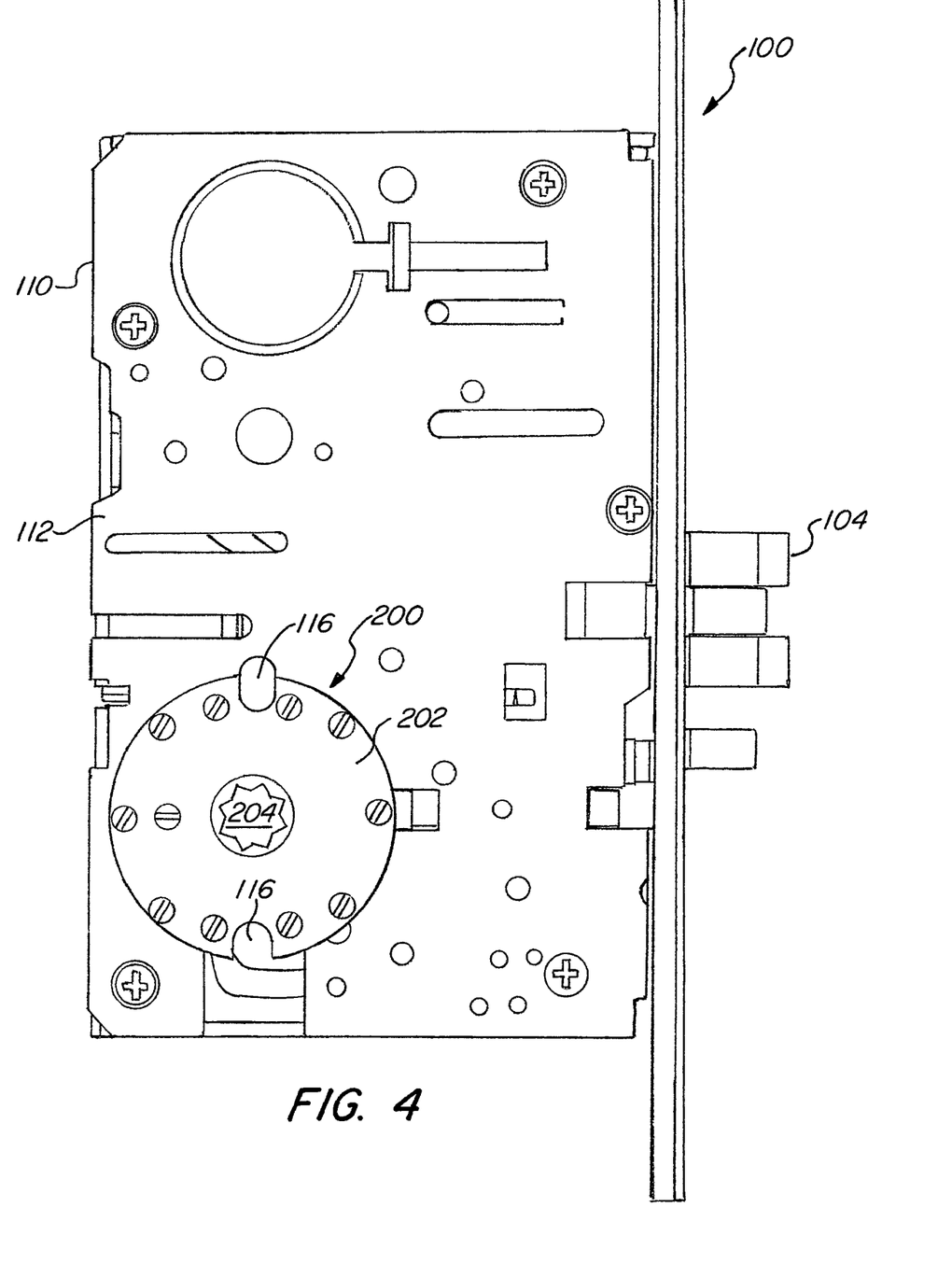
FIG. 4 is a side view of the door latch assembly including a delayed return mechanism.

FIG. 4 is a side view of the door latch assembly 100 with a delayed return mechanism 200. The mechanism 200 includes a housing 202 and a spindle hole 204 that is positioned adjacent to and coaxial with the opening 118 of the door latch assembly 100 such the spindle 120 passes through the opening 118 and the spindle hole 204. Like the opening 118, the surface of the spindle hole 204 is adapted to engage the spindle, such as with teeth and/or a patterned surface. Although the mechanism 200 is shown outside the housing 110 on an exterior face of the side panel 112, it may also be positioned within the housing 102.

Figure 5A:
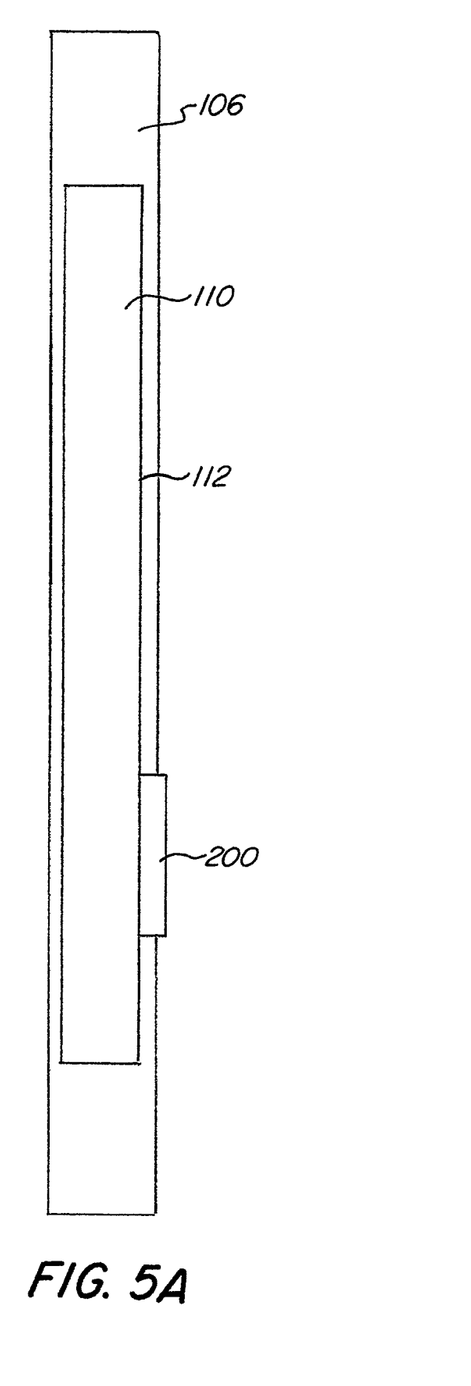
FIGS. 5A-5B are rear views of the door latch assembly with the delayed return mechanism.
Figure 5B:
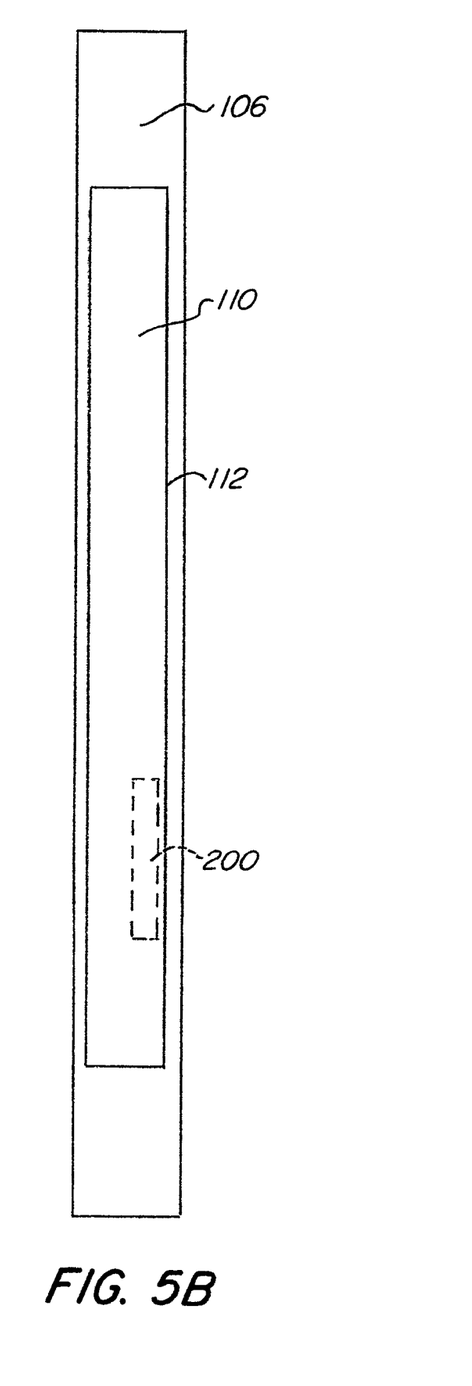

FIGS. 5A-5B show rear views of the door latch assembly 100 with the mechanism 200. In FIG. 5A, the mechanism 200 is attached to an outside surface of the side panel 112. In FIG. 5B, the mechanism 200 is within the housing 110. For example, the mechanism 200 may, in some embodiments, be secured to an inside surface of the side panel 112. The mechanism 200, and particularly the housing 202 of the mechanism 200, may be integrally formed with the housing 110 and/or side panel 112. In some embodiments, such as where there are two independently operating spindles 120, there are two mechanisms 200 with one positioned on each side (inside or outside) of the housing 110.

Figure 6:
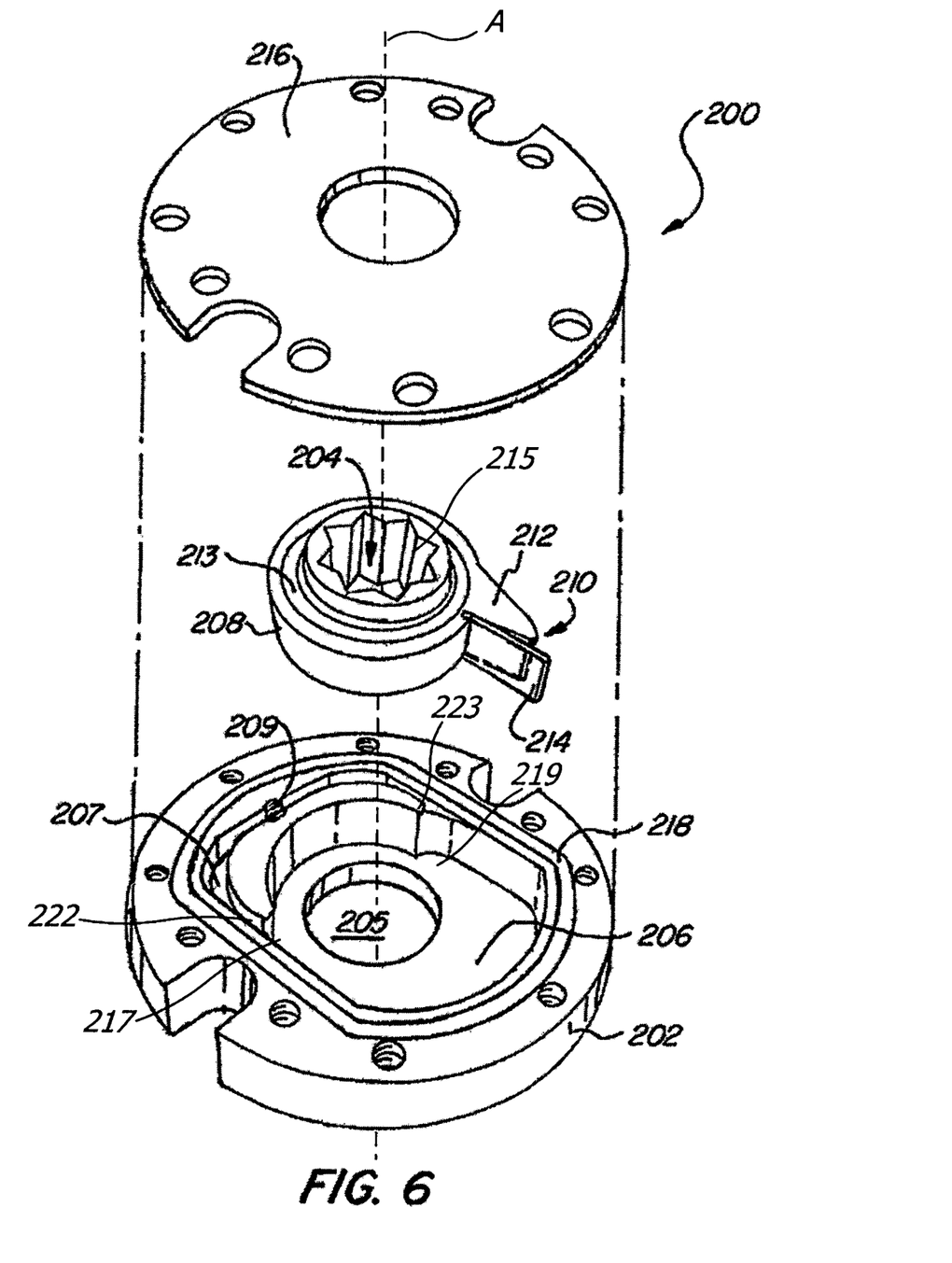
FIG. 6 is an exploded view of the delayed return mechanism.

FIG. 6 is an exploded view of the delayed return mechanism 200. The housing 202 includes a cavity 206, which is at least partially filled with a fluid media (F), with a central hole 205 having an axis (A). The cavity 206 has a curved outer wall adjacent to which the distal end of a fin 210 rotates, and two substantially parallel flat side walls. A rotatable hub 208, which includes the spindle hole 204, is positioned in the cavity 206. The spindle hole 204 has teeth 215 that engage with the spindle 120. There is also a channel 207 within the housing 202 that extends from a first opening 222 on a first side 217 of the cavity 206 to a second opening 223 on an opposite second side 219 of the cavity 206. The channel 207 includes an adjustment screw hole 209.

The hub 208 is at least partially surrounded by a media such as silicon, fluid or round granular media. In some embodiments, a light grease may be used. However, applicant has found that a low viscosity media can lead to insufficient and/or inconsistent resistance. Therefore, in a preferred embodiment, the media is a high viscosity material or putty. In one embodiment, the media comprises a grease (e.g., nano ceramic lubricating grease) mixed with a thickening agent. The viscosity of the media may be, for example, at least 5,000 centipoise (cP). In some embodiments, the viscosity is at least 50,000 cP or at least 100,000 cP, and preferably between 125,000 cP and 250,000 cP, such as 148,000 cP or 222,000 cP. In other embodiments, the viscosity may be at least 1,000,000 cP or at least 5,000,000 cP or more. The media also, or alternatively, has a high shear rate such as 50 (1/s) or higher. For example, in one preferred embodiment the media has a viscosity of at least 100,000 cP (100 Pas), such as 148,000 cP (148 Pas), and achieves a shear rate of at least 50 (1/s) at 25 C.

The housing 202 may be closed by a cover 216 that attaches to the housing 202 using fasteners (extending through the corresponding holes in the cover 216 and housing 202) or by other suitable means. In the exemplary embodiment, the mechanism 200, including the housing 202, the hub 208, and the cover 216, are made from a zinc alloy using a zinc die casting process. A gasket 218 in the housing 202 provides for a seal between the housing 202 and the cover 216. There may also be gaskets 213 on both sides of the hub 208 to provide seals between the hub 208 and the cover 216 and between the hub 208 and the cavity 208 (e.g., around the hole 205).

The hub 208 includes a radially extending fin 210. In some embodiments, the fin is a rigid or at least partially rigid straight fin. Preferably there is only one fin 210 extending from the hub 208. The fin 210 may have length extending to the curved outer wall of the cavity 206, or the length may be less to provide a gap below the fin 210 for media to pass. Likewise, the depth of the fin 210 (in the axial direction) may be the same as the hub 208 and fill a depth of the cavity 206, or may have a reduced depth for media to pass. As the hub 208 rotates, the fin 210 travels through the media and encounters resistance which slows the rotation of the hub 208. This, in turn, slows the rotation of the spindle 120 and the operation of the lock and reduces noise. In the present embodiment, the fin 210 is a two-piece fin including a rigid part 212 and a flexible portion 214. The rotation of the fin 210 may be limited (e.g., less than ninety degrees in either direction) by the shape of the cavity and the presence of the two substantially parallel flat walls which stop the fin 210 from further rotation.

Figure 7A:
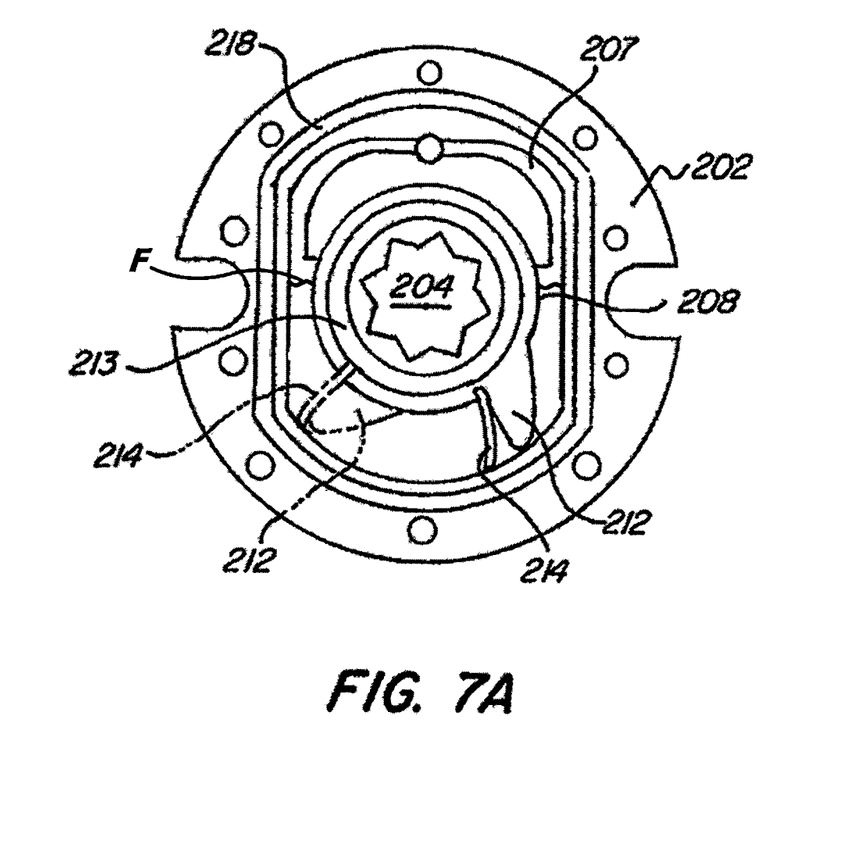
FIG. 7A is a cutaway view of the delayed return mechanism.
Figure 7B:
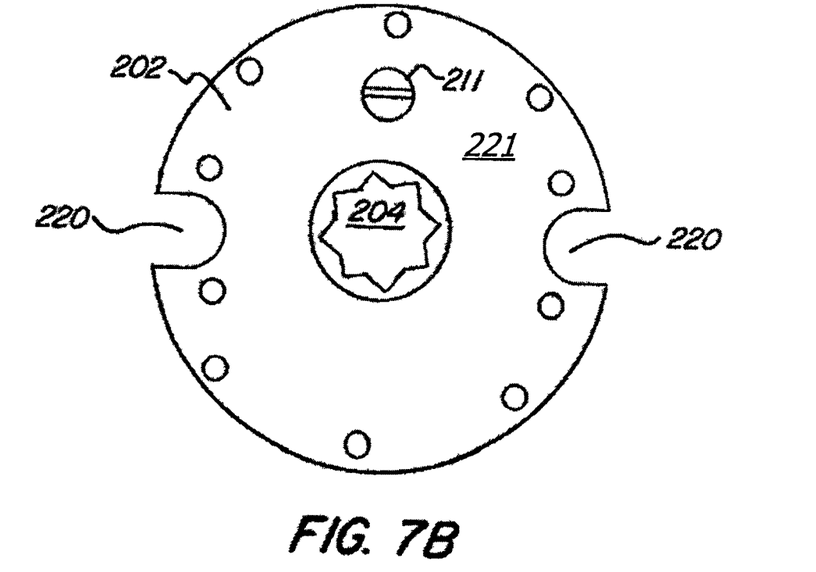
FIG. 7B is a bottom view of the delayed return mechanism.
Figure 7C:
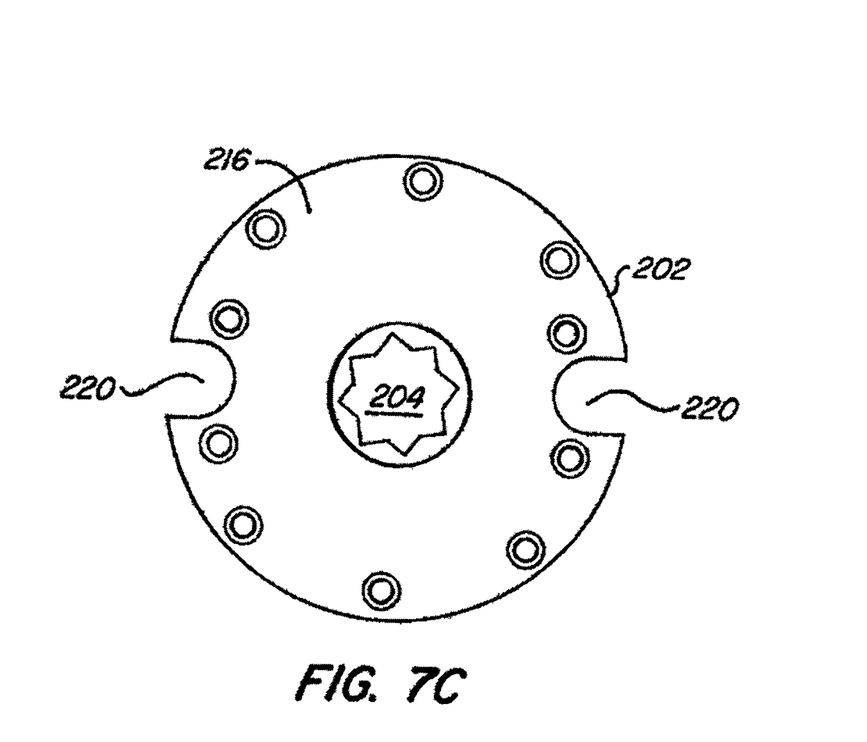
FIG. 7C is a top view of the delayed return mechanism.

FIGS. 7A-7C show additional views of the mechanism 200. FIG. 7A is a cutaway view of the mechanism 200 in operation. When the hub 208 rotates in one direction (e.g., counterclockwise to open the door 50) the flexible portion 214 is able to flex and allow more media to pass below the hub 208 with limited or no resistance experienced by the user. However, when the hub 208 returns and rotates in the opposite direction (e.g., clockwise), the flexible portion 214 is supported by the brace 212 and remains extended. Thus, the flexible portion 214 encounters more resistance travelling through the media in the opposite direction. Therefore, after a user opens the door 50 (e.g., and is no longer gripping the handle 102), the handle 102 and/or latch 104 slowly returns to the closed position keeping noise to a minimum. The hub 208 may be turned over to change the direction of increased resistance.

FIG. 7B is a bottom view of the mechanism 200. The exterior surface 221 of the housing 202 includes an adjuster 211 extending at least partially through the adjustment screw hole 209. Loosening the adjuster 211, such that its distal end is not in the channel 207, allows for a maximum amount of the media to flow from the cavity 206 and through the channel 207 as the hub 208 rotates. Tightening the adjuster 211 extends the distal end of the adjuster 211 into the channel 207 and restricts flow. Thus, the speed of the mechanism 200 can be changed by adjusting the adjuster 211 to open up or limit flow through the channel 207.

FIG. 7C is an opposite side view of the mechanism 200. Both the cover 216 and the housing 202 may include recesses 220 on either side of the mechanism 200. When the mechanism is attached to the latch assembly 100, the recesses 220 line up with the holes 116 on the housing 110 of the latch assembly 100 (as shown in FIG. 4). Screws or bolts 103 associated with the door handle 102 extend through the recesses 220 and into the holes 116 to secure the mechanism 200.

Figure 8A:
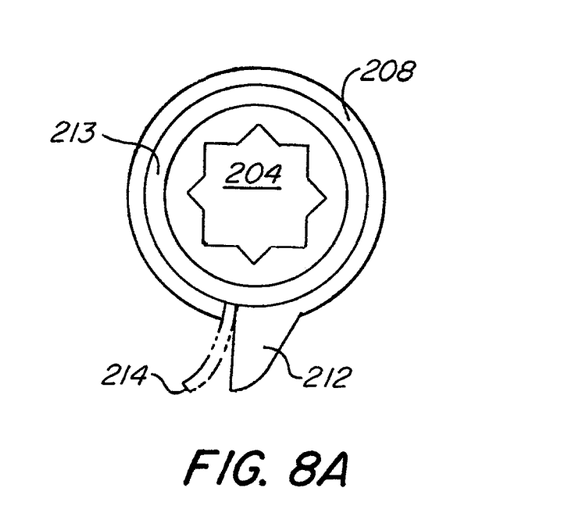
FIGS. 8A-8B are side views of hubs of the delayed return mechanism.
Figure 8B:
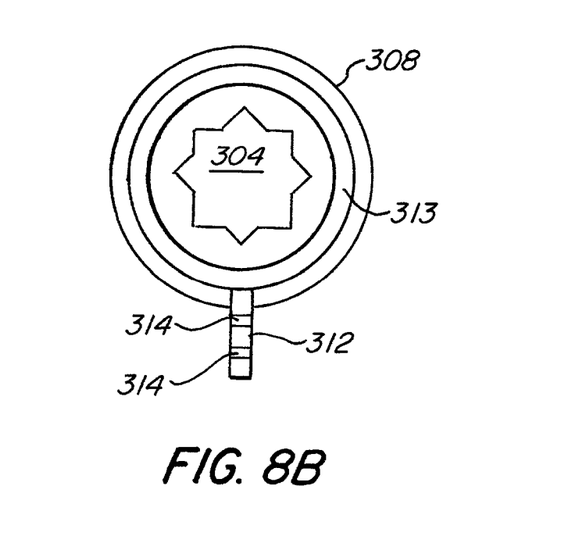

FIGS. 8A-8B show two embodiments of the hub of the delayed return mechanism 200. In FIG. 8A, the hub 208 from the previous example is illustrated. The hub 208 has the rigid part 212 and a flexible portion or fin 214 which allows for different levels of resistance in the counterclockwise versus clockwise directions. FIG. 8B shows an alternative embodiment in which the hub 308 includes a straight fin 312. The fin 312 may be rigid or flexible.

Figure 9:
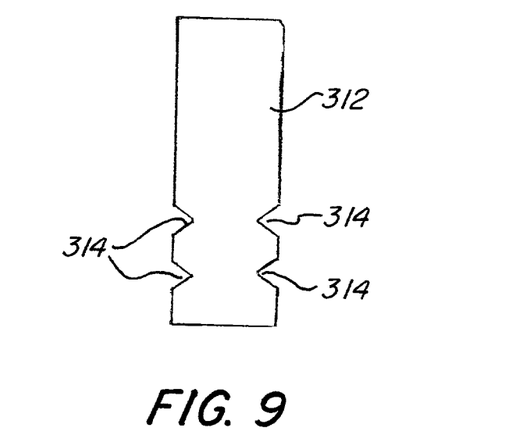
FIG. 9 is a front view of a fin of the delayed return mechanism.

As further illustrated in FIG. 9, in some embodiments, the fin 312 includes grooves 314 on one or both sides to allow media to pass by the fin 312. There may also be holes or slits through the fin 312. In the exemplary embodiment, the fin 312 is approximately 0.005-0.008 in. thick.

Figure 10:
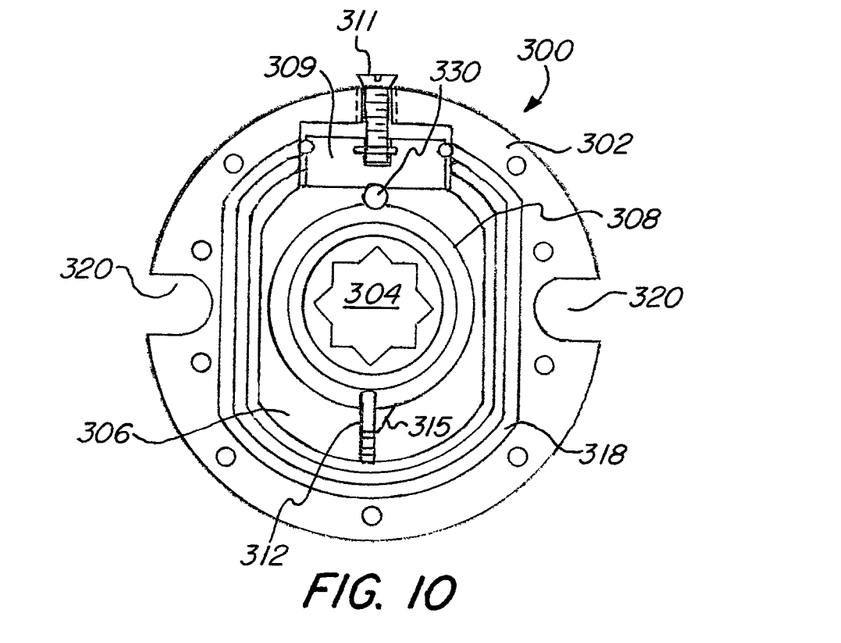
FIG. 10 is a cutaway view of a delayed return mechanism according to an exemplary embodiment of the present invention.

FIG. 10 is a cutaway view of a delayed return mechanism 300 according to an exemplary embodiment of the present invention. FIG. 10 illustrates an alternative adjustment arrangement in which the cavity 306 extends entirely around the hub 308. Rather than having and adjustment screw hole 209 in a channel 207 to adjustably restrict flow of the media, the mechanism 300 includes an alternative adjustment mechanism 309. By manipulating a screw 311 extending radially into the housing 302, the adjustment mechanism 309 is moveable into and out of the cavity 306 to restrict or open media flow as desired through a gap 330 between the adjustment mechanism 309 and the hub 308.

The mechanism 300 includes the fin 312. The fin 312 may be rigid or flexible. In the present embodiment, the fin 312 is flexible and has an (optional) brace 315 on one side. As described above with respect to FIG. 7A, when the hub 308 rotates in one direction (e.g., counterclockwise) the fin 312 is able to flex and allow more media to pass below the hub 308 with limited or no resistance. However, when the hub 308 rotates in the opposite direction (e.g., clockwise), the fin 312 is supported by the brace 315 and remains extended. Thus, the fin 315 encounters more resistance travelling through the media in the opposite direction.

Figure 11:
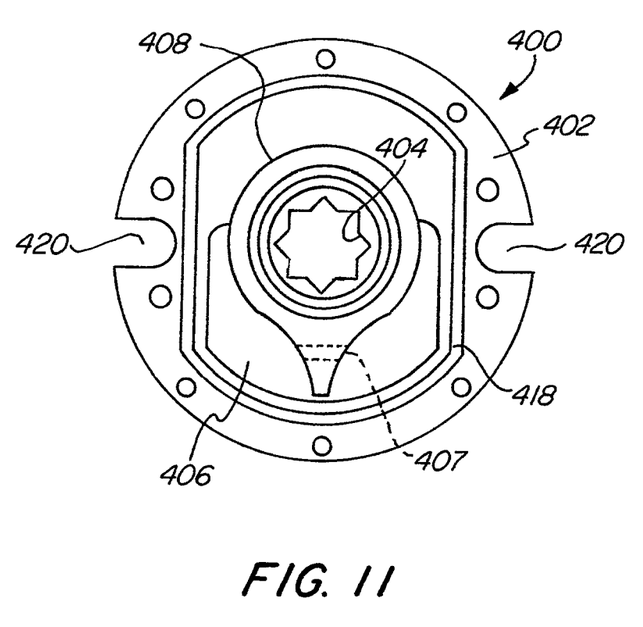
FIG. 11 is a cutaway view of a delayed return mechanism according to an exemplary embodiment of the present invention.

FIG. 11 illustrates a mechanism 400 including a hub 408 with a tapered fin. The hub 408 is positioned in a cavity 406 along with a media, such as a high viscosity grease-based media. The fin of the hub 408 includes a hole or channel 407 extending there through. In the exemplary embodiment, the channel 407 has a diameter of 0.05 in. As the hub 408 rotates, all or at least a majority of the media is forced to pass through the channel 407 which creates resistance and slows the mechanism.

Figure 12:
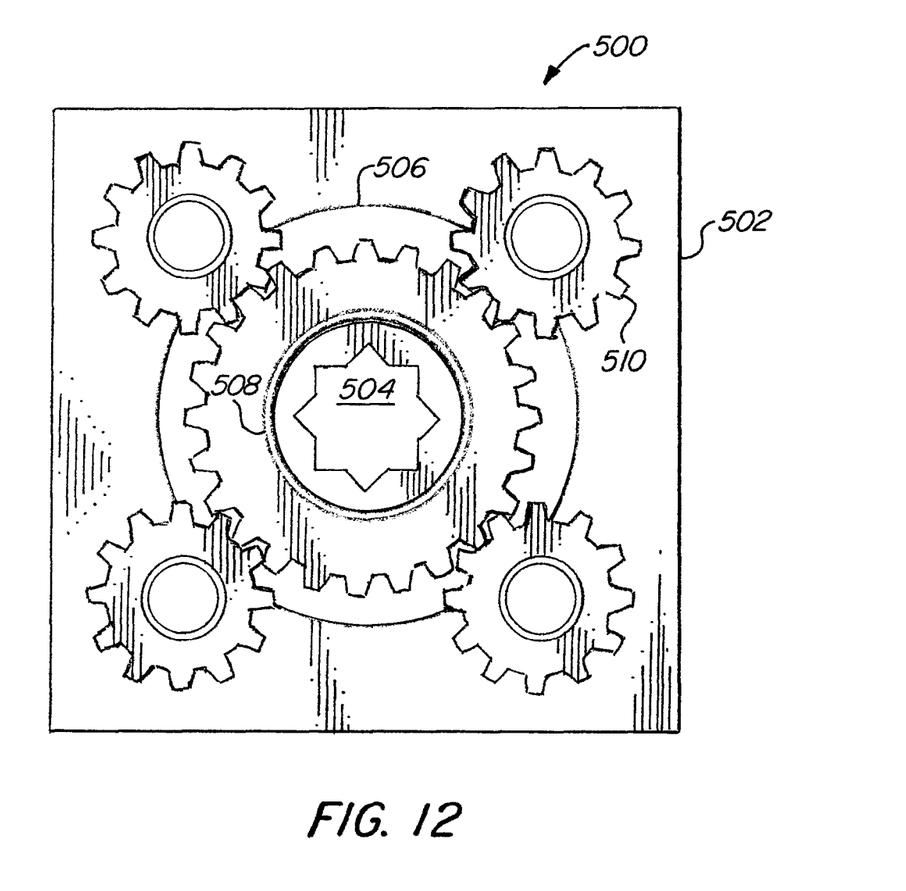
FIG. 12 is a cutaway view of a delayed return mechanism according to an exemplary embodiment of the present invention.

Another embodiment of a delayed return mechanism 500 is shown in FIG. 12. The mechanism 500 includes a housing 502 and a hub 508 with an opening 504 that is positioned adjacent to the opening 118 of the door latch assembly 100. A gear 506 is mounted about or integrated with the hub 508. The gear 506 meshes with a series of additional gears 510. In some embodiments, the gears 506/510 operate to slow movement of the hub 508 (and in turn the spindle 120) in both directions. In other embodiments, the gears 506/510 are configured to allow for free movement of the hub 508 in a first direction and restricted or slowed movement in the opposite direction.

The mechanisms 200/300/400/500 are shown and described herein as being applicable to a door latch assembly 100. However, the mechanisms 200/300/400/500 are not limited to use on door latch assemblies 100 of the mortise type to door latch assemblies in general. The mechanism 200/300/400/500 may be used on any number of different door latches, and also for any application in which it is desired to slow movement in one direction while allowing free or at least faster movement in the opposite direction.

Figures 13A, 13B:
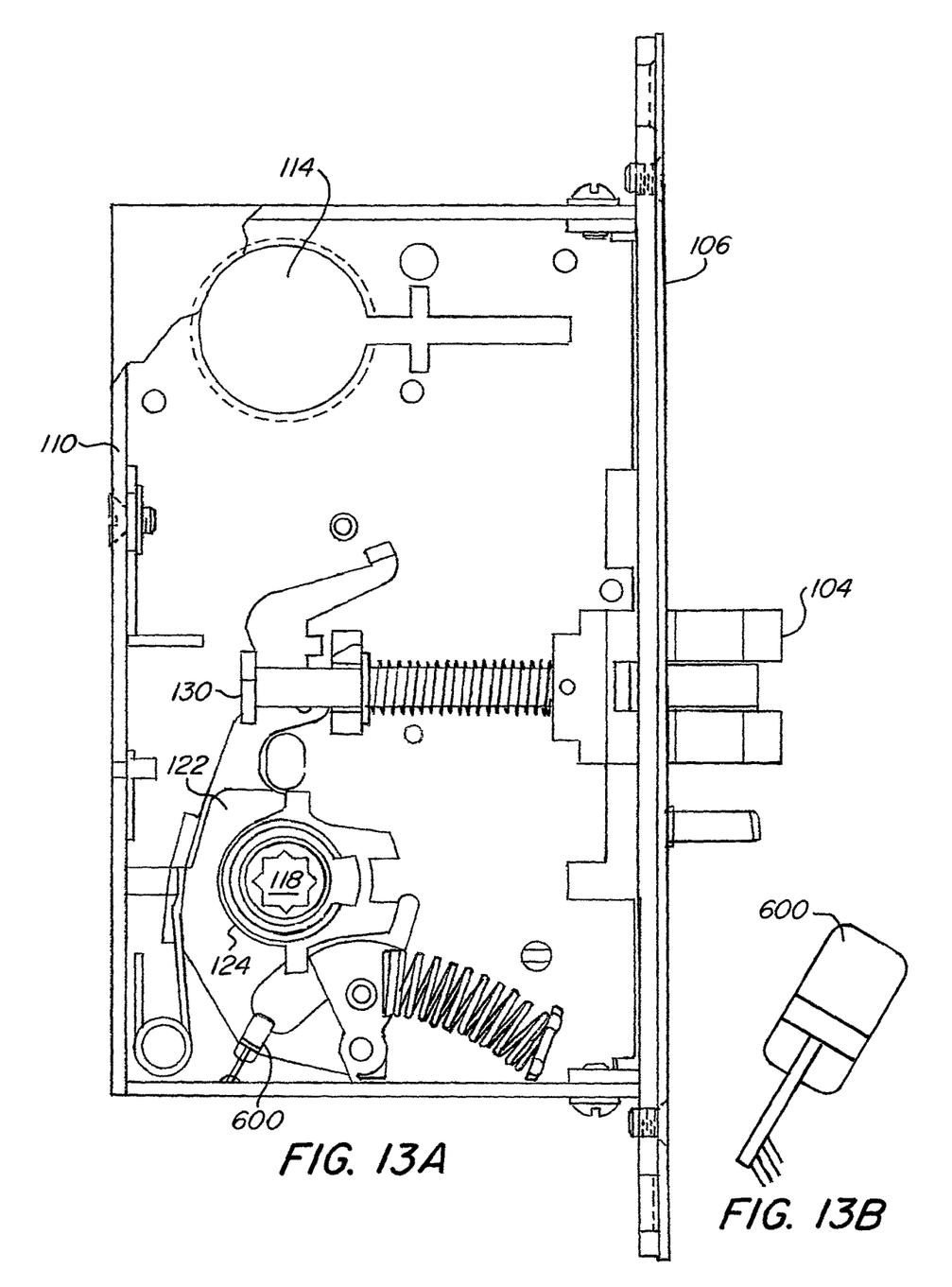
FIG. 13A is a cutaway view of a door latch assembly with an internal air pot delayed return mechanism.
FIG. 13B further illustrates the air pot delayed return mechanism shown in FIG. 13A.

FIGS. 13A-13B show another alternative embodiment in which an air pot 600 is attached between a retraction portion of the lever 122 and the housing 110. The air pot 600 is configured to restrict or slow movement of the lever 106 (and in turn a door handle extending through the opening 108) in a first direction and allow for free movement in the opposite direction.

Although the invention has been described with reference to a particular arrangement of parts, features and the like, these are not intended to exhaust all possible arrangements or features, and indeed many modifications and variations will be ascertainable to those of skill in the art.

What is claimed is:

1. A delayed return mechanism, comprising:
   a housing including a hole with an axis;
   a cavity in the housing at least partially filled with a fluid media;
   a hub disposed in said cavity including a spindle hole coaxial with the hole in said housing including teeth within the spindle hole adapted to engage a spindle, said hub being rotatable about the axis and having a fin extending radially outward in said cavity; and
   a channel through which the fluid media passes during rotation of said hub to control flow of the fluid media about said cavity.

2. The mechanism according to claim 1, wherein the fluid media has a viscosity of at least 100,000 cP.

3. The mechanism according to claim 2, wherein the fluid media has a shear rate of at least 50 (1/s).

4. The mechanism according to claim 1, further comprising an adjustment element including an adjuster moveable into and out of the channel, the channel extending through a portion of the housing, wherein movement of the adjuster changes a cross section of the channel.

5. The mechanism according to claim 4, wherein the channel extends from a first opening on a first side of said cavity to a second opening on a second side of said cavity, and wherein the adjuster is moveable into and out of the channel via a hole extending through an exterior surface of said housing.

6. The mechanism according to claim 4, wherein the channel at least partially circumscribes said hub, and wherein the adjuster is moveable radially inward and outward with respect to said hub.

7. The mechanism according to claim 1, wherein the fin consists of a rigid part extending radially outward from said hub.

8. The mechanism according to claim 1, wherein the fin includes a rigid part and a flexible part adjacent to the rigid part.

9. The mechanism according to claim 1, wherein the fin includes the channel through which the media passes.

10. The mechanism according to claim 1, wherein rotation of said hub in a first direction is partially resisted by the media and rotation of the hub in a second opposite direction is partially resisted by the media, wherein resistance in the second direction is greater than resistance in the first direction.

11. The mechanism according to claim 1, wherein the spindle hole is adapted to engage a door handle with the spindle extending from the door handle.

12. The mechanism according to claim 11, wherein said housing includes two oppositely disposed recesses for engaging door handle fasteners that extend through the door latch.

13. The mechanism according to claim 1, further comprising a cover plate removably attached over said cavity.

14. The mechanism according to claim 13, wherein the housing includes a gasket circumscribing said cavity.

15. A delayed return mechanism for a door latch, comprising:
a housing including a hole with an axis;
a cavity in the housing at least partially filled with a fluid media;
a cover plate removably attached over said cavity;
a hub disposed in said cavity including a spindle hole coaxial with the hole in said housing for receiving a spindle extending through the spindle hole and the hole in said housing, said hub being rotatable about the axis and having a fin including a rigid part extending radially outward in said cavity;
an adjustment element adjustably restricting flow of the fluid media about said cavity, said adjustment element including an adjuster moveable into and out of an elongated channel via a hole extending through an exterior surface of said housing, the elongated channel extending from a first opening on a first side of said cavity to a second opening on a second side of said cavity; and
a gasket in said housing at least partially circumscribing said cavity and the elongated channel.

16. A door latch for an architectural door, comprising:
a latch housing including a front plate attachable to a door edge;
a latch bolt at least partially slideable into and out of said latch housing through the front plate;
a spindle for receiving a door handle;
a retractor for actuating said latch bolt, said retractor including a retractor hub with a spindle hole;
a damper including a housing including a cavity at least partially filled with a fluid media, a damper hub disposed in said cavity including a spindle hole coaxial with the spindle hole of the retractor hub, said hub having a fin extending radially outward in the cavity, and a restricting channel controlling flow of the fluid media about the cavity; and
a spindle extending through said latch housing via the spindle holes of the retractor hub and the damper hub, rotation of said spindle causing rotation of the retractor hub and movement of said latch bolt, the movement of said latch bolt at least partially dampened by said damper.

17. The door latch according to claim 16, wherein the fluid media has a viscosity of at least 140,000 cP.

18. The door latch according to claim 16, wherein the fluid media has a viscosity of between 200,000 cP and 250,000 cP.

19. The door latch according to claim 16, wherein the fluid media has a shear rate of at least 50 (1/s).

20. The door latch according to claim 16, further comprising an adjustment element including an adjuster moveable into and out of the channel, the channel extending through a portion of the housing, wherein movement of the adjuster changes a cross section of the channel.

21. The door latch according to claim 20, wherein the channel extends from a first opening on a first side of said cavity to a second opening on a second side of said cavity, and wherein the adjuster is moveable into and out of the channel via a hole extending through an exterior surface of said housing.

22. The door latch according to claim 16, wherein said damper is positioned within the latch housing.

23. The door latch according to claim 16, wherein said damper is attached to an exterior surface of the latch housing.

24. The door latch according to claim 16, wherein the fin includes the channel through which the media passes.

25. The door latch according to claim 16, wherein rotation of the hub in a first direction is partially resisted by the media and rotation of the hub in a second opposite direction is partially resisted by the media, wherein resistance in the second direction is greater than resistance in the first direction.

* * * * *